Oct. 5, 1965   A. L. PELCIN   3,209,563
DOOR CONTROL MECHANISM
Filed Nov. 6, 1962   2 Sheets-Sheet 1

INVENTOR.
ALBERT L. PELCIN
BY Williams, David,
Hoffmann & Yount.
ATTORNEYS

Oct. 5, 1965  A. L. PELCIN  3,209,563
DOOR CONTROL MECHANISM
Filed Nov. 6, 1962  2 Sheets-Sheet 2
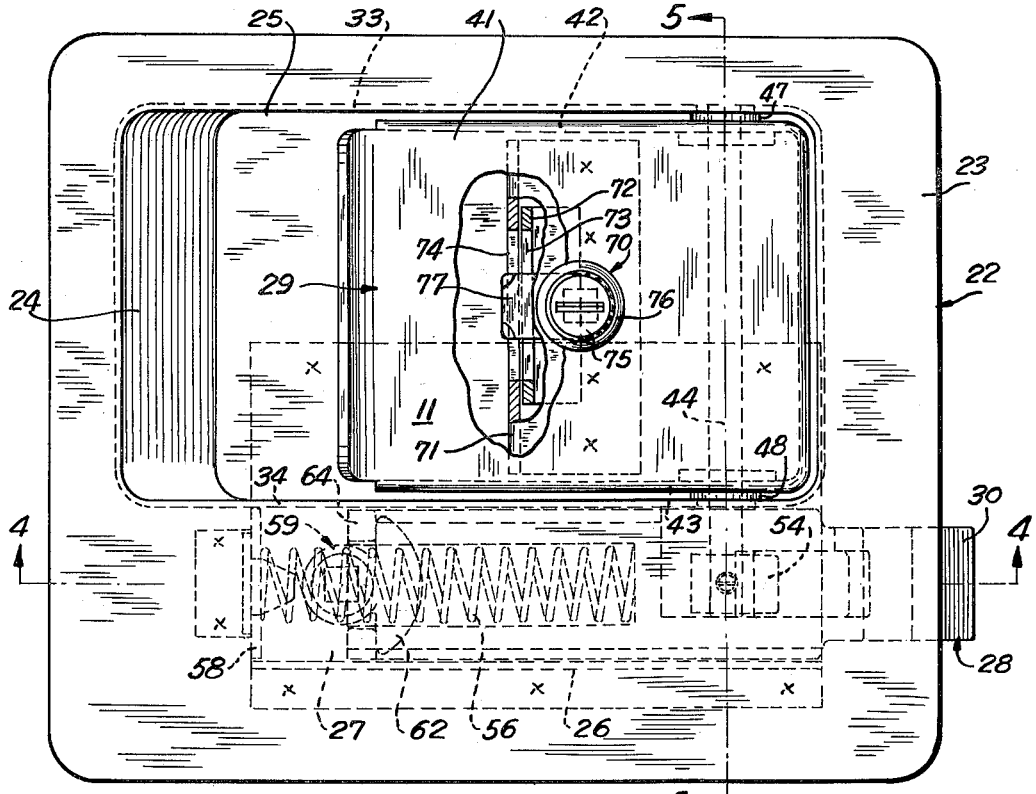
FIG. 3
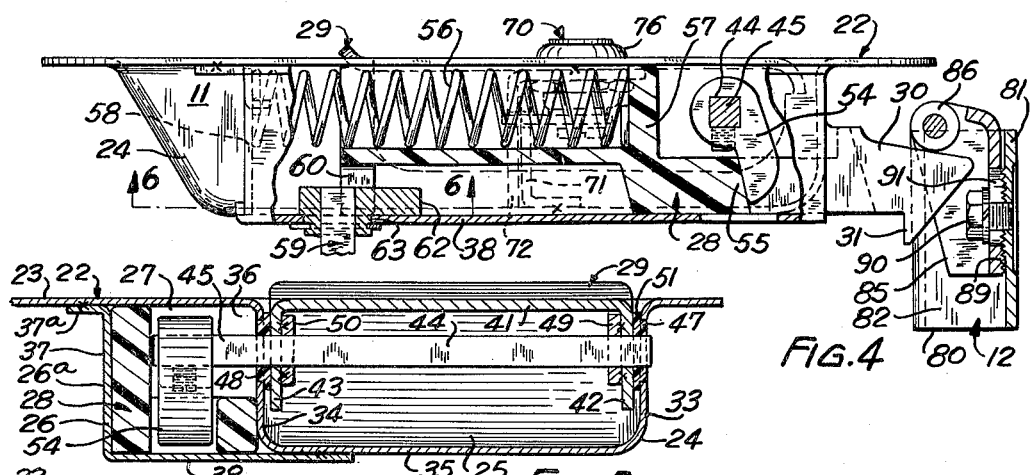
FIG. 4
FIG. 5
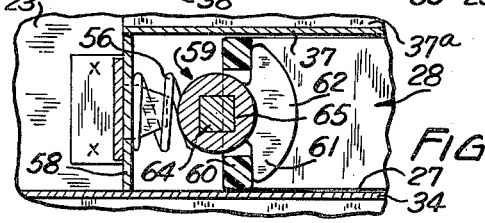
FIG. 6
INVENTOR.
ALBERT L. PELCIN
BY Williams, David,
Hoffmann & Yount.
ATTORNEYS 3,209,563
DOOR CONTROL MECHANISM
Albert L. Pelcin, Bedford, Ohio, assignor to The Eastern Company, Cleveland, Ohio, a corporation of Connecticut
Filed Nov. 6, 1962, Ser. No. 235,684
14 Claims. (Cl. 70—146)

This invention relates to door lock mechanisms and, more particularly, to lock mechanisms of the type which occupy a substantially flush position when installed in an opening of the door structure and which, although applicable to various uses, are particularly suitable for the doors of automotive vehicles because they normally do not have any projecting part likely to cause personal injury.

When the automotive vehicle is a refrigerated truck used to carry frozen foods and the like, existing regulations call for a below-zero temperature in the cargo space and this low temperature makes necessary the use of heat insulation of substantial thickness on the cargo space access doors. The elimination of a projecting handle on the access doors by the use of a flush-type lock mechanism is especially important when the access doors are on the sides of the vehicle, as is often the case for frozen food delivery trucks, but has heretofore posed a difficult problem, first, because the lock mechanisms available for use could be accommodated in the door only by decreasing the thickness of the insulation with a resulting storage temperature impairment and, second, because if the thickness of the doors were increased to accommodate the available lock mechanisms in association with insulation of the full thickness needed to maintain the specified storage temperature, the width of the cargo space would be correspondingly decreased.

As one object thereof the present invention aims to solve this problem by providing a novel flush-type lock mechanism which is applicable to various uses but which is especially suitable for a heat-insulated door because the device is of a reduced or minimum thickness, and consequently, the insulation of the door need not be unduly reduced in thickness to accommodate the mechanism.

As another of its objects this invention also aims to provide such a novel lock mechanism having a body which includes a pan-shaped portion for accommodating an actuating handle in a flush or recessed position, and a bolt housing on the body in a laterally adjacent relation to the pan-shaped portion so that the guideway of the bolt housing lies in substantially the same plane as the recess for achieving minimum thickness for the lock mechanism.

A further object is to provide a novel flush-type lock mechanism of such minimum thickness in which a pivot shaft having the recessed handle connected therewith extends laterally into the bolt housing for actuation of the bolt.

Still another object is to provide such a novel flush-type lock mechanism of a quiet and wear resistant construction, as well as one in which the occurrence of condensation, corrosion and frost is eliminated or minimized. These advantages are achieved by the use of plastic material for certain important parts of the mechanism including the bolt and the bearing members for mounting the pivot shaft in the body of the mechanism.

Yet another object is to provide a novel flush-type lock mechanism of the character above indicated and which includes a second actuating means for the bolt as an emergency precaution feature and by which the bolt can be moved to unlatching position from the inside of the door.

Additionally, this invention provides a novel door lock mechanism having an actuating handle in recessed position and key-actuatable locking means on the handle for co-operation with adjacent parts in a manner to achieve maximum strength and security when the mechanism is in its locked condition.

Other objects, novel characteristics and advantages of this invention will be apparent in the following detailed description and in the accompanying drawings forming a part of this specification and in which, FIG. 1 is a horizontal section taken through associated door and doorframe structures equipped with the novel lock mechanism of this invention, the latch device of the mechanism being mounted on the door structure and appearing in edge elevation, as indicated by section line 1—1 of FIG. 2, and the keeper being mounted on the doorframe structure and appearing in horizontal section;

FIG. 3 is a front elevational view of the latch device with a portion thereof shown in section;

FIG. 4 is a sectional view taken through the latch device on section line 4—4 of FIG. 3 and also showing the keeper in section;

FIG. 5 is a transverse section taken through the latch device on section line 5—5 of FIG. 3; and FIG. 6 is a fragmentary sectional view taken on section line 6—6 of FIG. 4.

Figure 1:
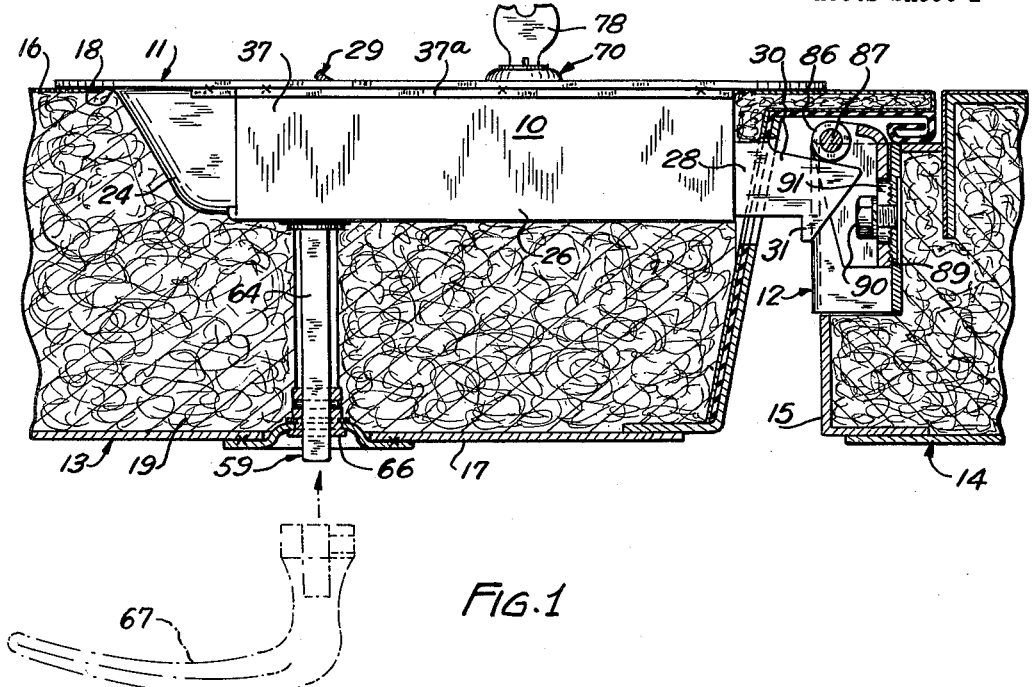

As a preferred embodiment of the door lock mechanism 10 of this invention the accompanying drawings show the mechanism as comprising a latch device 11 of the flush-mount type and an associated keeper 12. The latch device 11 and keeper 12 are mounted respectively on door and doorframe structures 13 and 14 which are represented as being portions of the body of an automotive vehicle such as a refrigerated frozen food delivery truck.

The doorframe structure 14 includes an upright edge wall 15 on which the keeper 12 is suitably mounted. The door structure 13 is a swingable structure having front and rear walls 16 and 17 on the outer and inner sides thereof and of which the front wall 16 is provided with an opening 18 for receiving portions of the latch device 11. The door and doorframe structures 13 and 14 are provided with heat insulating material 19 for maintaining a desired low temperature in the storage space of the vehicle body to which access is controlled by the door 13. As will be further explained hereinafter, the construction of the latch device 11 is one which achieves a reduced or minimum front-to-back thickness for reducing to a minimum the amount of the insulating material 19 which must be omitted or removed from the door 13 to accommodate the latch device.

The latch device 11 comprises a body 22 having a front wall 23 and a pan-shaped portion 24 projecting rearwardly from such front wall and containing a shallow recess 25. The body 22 includes a bolt housing 26 providing a guideway 27 in which a bolt 28 is movable and is actuatable in response to swinging of a handle 29 located in the recess 25. The bolt 28 includes a suitably shaped latching portion 30 which projects from the bolt housing 26 and co-operates with the keeper 12 as shown in FIGS. 1 and 4. A stop 31 on the latching portion 30 is engageable with the bolt housing 26 for limiting the retracting or unlatching movement of the bolt 28.

The body 22 serves as a mounting member for the latch device 11 and the front plate 23 thereof is adapted to be secured against the front wall 16 of the door 13 in a substantially flush relation as by suitable fastening means (not shown). When the latch device 11 is mounted in this relation on the door 13 the projecting pan-shaped portion 24 and the bolt housing 26 are received in the opening 18 of the front wall of the door. The bolt housing 26 is located in a laterally adjacent relation to the pan-shaped portion 24 and extends along one side of the latter so that the guideway 27 of the bolt housing lies in substantially the same plane as the recess 25 and the latch device 11 will accordingly be of minimum thickness in the front-to-back direction and will require the omission or removal of only a small portion of the insulating material 19.

The pan-shaped portion 24 has substantially parallel side walls 33 and 34 on laterally opposite sides of the recess 25 and includes a rear wall 35 connecting these side walls and forming the bottom of the recess. The bolt housing 26 is here shown as comprising a single housing member 26ª of an angular cross-sectional shape and which co-operates with the side wall 34 and a portion of the front wall 23 in defining the guideway 27. The side wall 34 and the adjacent front wall portion with which it is connected define an included angle 36 forming one corner of the guideway 27, and the housing member 26ª has leg walls 37 and 38 disposed opposite this included angle. The leg wall 37 includes a flange portion 37ª which is secured to the rear side of the front wall 23 by being welded thereto and the leg wall 38 partially overlies the rear wall 35 and is welded thereto.

From the construction just above described for the body 22 and the bolt housing 26, it will be recognized that the bolt housing extends in a contiguous relation along the side wall 34 of the pan-shaped portion 24 so that this side wall is common to the recess 25 and to the guideway 27. The depth of the guideway 27 in the front-to-back direction of the latch device 11 is substantially the same as the depth of the recess 25 and lies in substantially the same plane as the recess.

The handle 29 comprises a generally flat plate member 41 having a normally retracted position in the recess 25 and in which position the handle forms a partial cover for the recess. The handle 29 includes a pair of in-turned flanges 42 and 43 which lie adjacent the spaced side walls 33 and 34 of the pan-shaped portion 24. Swinging of the handle 29 in an outward direction from the recess 25 operates to retract the bolt 28 from its door-latched engagement with the keeper 12.

The handle 29 is connected with the body 22 for such swinging movement by a shaft 44 extending transversely of the recess 25 and having an end portion 45 projecting into the guideway 27 of the bolt housing 26. The shaft 44 is of a non-circular cross-sectional shape and extends through corresponding noncircular openings in the flanges 42 and 43 so that the handle 29 is mounted on the shaft in a fixed driving relation thereto.

The shaft 44 is pivoted on the side walls 33 and 34 by bearing members 47 and 48 mounted on the shaft and received in circular openings of such walls. The bearing members 47 and 48 are made of a wear-resistant molded plastic material, preferably nylon, so as to provide for a smooth and quiet operation of the handle 29 with minimum bearing wear in the swingable mounting thereof. The portions of the flanges 42 and 43 through which the shaft 44 extends are suitably reinforced and thickened by reinforcement members 49 and 50 which are connected with these flanges by welding.

The plastic bearing members 47 and 48 are constructed with washer-like flange portions 51 which serve as spacer elements and lie between the side walls 33 and 34 and the adjacent flanges 42 and 43 of the handle 29. The spacer elements 51 contribute to the smooth and quiet functioning of the handle 29. By making the bearing members 47 and 48 of plastic material the additional important advantage is achieved that condensation, corrosion and frost formation at this location are avoided.

The bolt 28 is actuatable by the handle 29 by means of a lever member 54 located in the guideway 27 and mounted on the projecting end portion 45 of the shaft 44. The lever member 54 is engageable with a first thrust portion 55 provided on the bolt 28 and, upon pivotal movement of the shaft produced by the outward swinging of the handle 29 relative to the recess 25, the bolt is shifted in the guideway 27 in opposition to a compression spring 56 and toward a door-unlatched position in which the latching portion 30 becomes disengaged from the keeper 12. The compression spring 56 is located in the guideway 27 with one end thereof in engagement with a spring seat portion 57 of the bolt and the other end thereof in engagement with a stationary spring seat formed by a removable end wall 58 of the bolt housing 26.

To avoid the corrosive effects of condensation forming on the latch device 11 and on the keeper 12, the various metal parts of the latch device and keeper are preferably made of stainless steel. Reduction in the amount of wear, condensation, corrosion and frost on the bolt 28 is achieved by making the bolt of plastic material of a strong and durable character, preferably nylon. By eliminating or reducing the condensation forming on the bolt 28, the tendency of sticking of the bolt due to freezing of the condensation is greatly reduced.

A second actuating means 59 is provided for the bolt 28 as a safety feature of the lock mechanism 10 by which the bolt can be retracted to its door-unlatched position by any person who might become trapped in the refrigerated cargo space of the vehicle. For the purpose of this second actuating means the bolt 28 is provided with a second thrust portion, in this case, a pair of lugs 60 located adjacent the arms 61 of a rollback member 62. The rollback member 62 is located in the guideway 27 and is pivotally mounted in an opening 63 of the leg wall 38 of the bolt housing.

The second actuating means 59 also includes a shaft 64 of a noncircular cross-section engaged in a correspondingly shaped opening 65 of the rollback 62 and which shaft projects rearwardly from the latch device 11 through the insulating material 19 and through a suitable bearing assembly 66 mounted on the inner wall of the door 13. By applying an auxiliary handle 67 to the projecting end of the shaft 64 a person trapped in the refrigerated cargo space can actuate the rollback 62 and thus shift the bolt 28 to its door-unlatching position to permit opening of the door 13.

The latch device 11 is provided with locking means 70 by which the handle 29 can be locked against swinging movement relative to the body 22. The locking means 70 includes a first flange 71 on the rear wall 35 and projecting toward the handle 29 and a second flange 72 on the underside of the handle and projecting toward the rear wall 35. The flanges 71 and 72 are here shown as portions of lug members mounted respectively on the rear wall 35 and the handle 29. The flanges 71 and 72 are provided with slots 73 and 74 which lie in an opposed and substantially aligned relation when the handle 29 is in its retracted position.

The locking means 70 also includes a key-actuatable cylinder member 75 pivotally moveable in a suitable barrel member 76 mounted in an opening of the handle 29. A locking member 77 carried by the cylinder member 75 is swingable thereby to a locking position in the aligned slots 73 and 74 as shown in FIGS. 3 and 5. When the locking member 77 extends into the slots 73 and 74 swinging of the handle 29 will be prevented, and retraction of the locking member from the slots by manipulation of the key 78 will release the handle for swinging relative to the body 22.

The flange 71 is located on the bottom wall 35 so as to lie on the pivot-axis side of the flange 72 of the handle 29. The barrel 76 is located on the handle 29 at a point between the flange 71 and the shaft 44 so that the locking member 77 engages in the slot 74 by extending through the slot 73. This relative arrangement for the parts of the locking means 70 provides a construction of increased strength and maximum security for the locked condition of the latch device 11.

Figure 2:
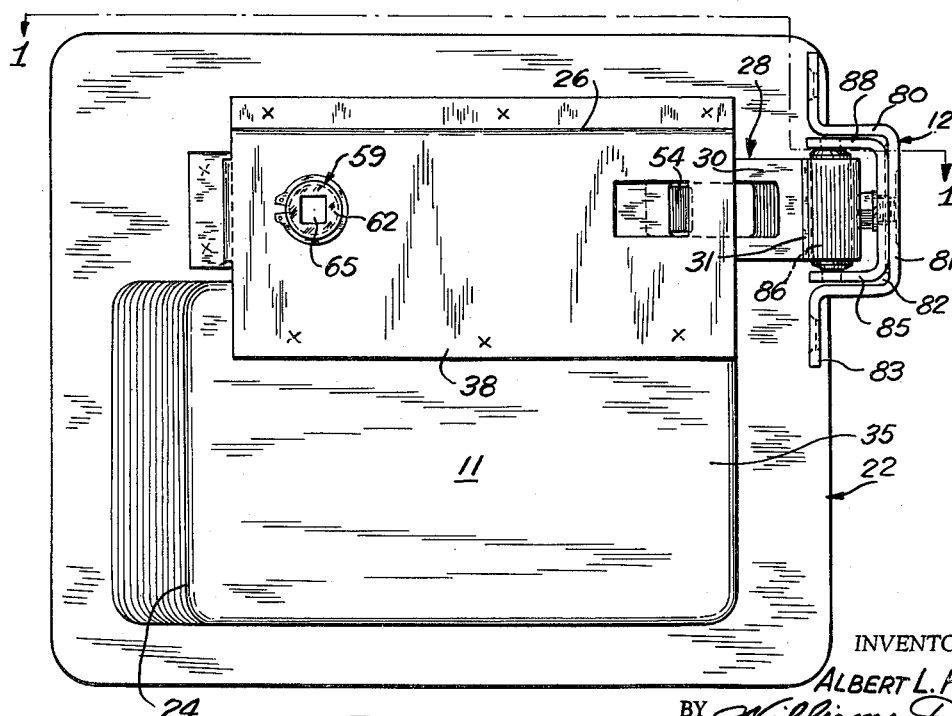
FIG. 2 is a rear elevational view of the latch device and keeper.

The keeper 12 is here shown as comprising a channel-shaped member 80 (see FIG. 2) having an intermediate wall portion 81 forming the bottom wall of a channel recess 82. The keeper member 80 also has oppositely extending lugs 83 by which the keeper is mounted on the edge wall 15 of the doorframe 14. The keeper 12 also comprises a channel-shaped insert 85 located in the channel recess 82 of the keeper member 80 and a roller 86 mounted on the insert and engageable as a striker element by the latching portion 30 of the bolt 28. The roller 86 is supported by a pivot shaft 87 whose ends are secured in the spaced legs 88 of the channel-shaped insert 85.

The keeper member 80 is mounted in a fixed relation on the doorframe 14 but the insert 85 is adjustably movable to locate the roller 86 for its best co-operation with the latching portion 30 of the bolt 28. For the purpose of this adjustment of the keeper 12, the wall 81 and the adjacent portion of the insert 85 are provided with co-operating serrations 89 for holding the insert in a selected position relative to the keeper member 80. The insert 85 can be clamped in its adjusted position by a clamping screw 90 extending through a slot 91 of the insert and threadedly engaged in an opening of the wall 81. When the screw 90 is tightened, the interengagement of the teeth of the serrations 89 will hold the insert in its adjusted position for locating the roller 86 in the desired relation to the bolt 28.

From the accompanying drawings and the foregoing detailed description it will now be readily understood that this invention provides door lock mechanism embodying a flush-mount latch device which can be used to advantage on a heat insulated access door of a refrigerated storage space. It will now also be understood that the herein disclosed structural features and characteristics of the latch device and its associated keeper provide for a smooth, quiet and trouble-free operation of the lock mechanism.

Although the door lock mechanism of this invention has been illustrated and described herein to a somewhat detailed extent it will be understood, of course, that the invention is not to be regarded as being limited correspondingly in scope but includes all changes and modifications coming within the terms of the claims hereof.

Having described my invention, I claim:

1. In door lock mechanism including a latch device of the flush-mount type, a body having a front mounting wall for engagement with a support and a hollow pan-shaped portion connected with said front wall and projecting rearwardly therefrom, said pan-shaped portion providing a shallow recess having a front opening lying substantially in the plane of said front wall, a handle in said recess in a position normally forming a partial cover for said front opening, a shaft pivoted on said body and swingably connecting said handle therewith, means on said body providing a bolt housing on the rear side of said front wall and in a laterally adjacent relation to said pan-shaped portion, a bolt in said bolt housing and movable between latching and unlatching positions, spring means urging said bolt toward said latching position, said shaft having an end portion projecting laterally from said pan-shaped portion and extending into said bolt housing, and lever means on said shaft end portion and effective against said bolt for moving the same toward said unlatching position in opposition to said spring means and in response to swinging of said handle away from its normal position.

2. A latch device for mounting in an opening of a heat-insulated door, comprising a body having a front wall for substantially flush engagement with the portion of the door surrounding said opening and a pan-shaped portion on the rear side of said front wall and receivable in said opening, said pan-shaped portion providing a shallow-depth recess and having spaced side walls on laterally opposite sides of said recess, a bolt housing on the rear side of said front wall and extending in a contiguous relation along one of said side walls and being also receivable in said opening, a bolt in said bolt housing and movable between door-latched and door-unlatched positions, spring means urging said bolt toward said door-latched position, a handle in said recess, a shaft connecting said handle with said body for swinging relative thereto, said shaft being pivotally mounted on said side walls and having an end portion extending into said bolt housing, and lever means on said end portion and effective against said bolt for moving the same toward said door-unlatched position in opposition to said spring means and in response to swinging of said handle.

3. A latch device comprising a pan-shaped hollow body providing a shallow-depth recess and having spaced side walls on laterally opposite sides of said recess, a bolt housing on said body and providing a guideway lying substantially in the plane of said recess and extending along one of said walls on the laterally opposite side thereof from said recess, a bolt movable in said guideway between latching and unlatching positions, spring means urging said bolt toward said latching position, a handle in said recess, a shaft pivotally connecting said handle with said body for swinging relative thereto, said shaft having a portion thereof extending through said one wall into said bolt housing in a direction transverse to said guideway, and lever means on said shaft portion and effective against said bolt for moving the same toward said unlatching position in opposition to said spring and in response to swinging of said handle.

4. A latch device according to claim 3 and comprising bearing members of wear-resistant plastic material interposed between said side walls and shaft for pivotally supporting the latter.

5. A latch device according to claim 3 wherein said side walls have openings therein and said shaft is of a non-circular cross-sectional shape, and nylon bearing members mounted on said shaft and rockable in said openings.

6. A latch device according to claim 3 wherein said side walls have openings therein and said shaft is of a non-circular cross-sectional shape, and bearing members of plastic material mounted on said shaft and rockable in said openings, said handle having spaced flanges adjacent said side walls and said bearing members having spacer portions lying between said flanges and side walls.

7. A latch device according to claim 3 and having a second bolt actuating means pivoted on said bolt housing and engageable with a portion of said bolt.

8. A latch device according to claim 7 wherein said recess extends into said body from the front side of the latch device and said bolt housing includes a rear wall, said second bolt actuating means comprising a rollback member pivoted on said rear wall and engageable with said bolt, and means for imparting pivotal movement to said rollback member.

9. A latch device according to claim 3 wherein said body includes a rear wall portion at the bottom of said recess and a front wall portion connected with said one side wall and defining with the latter an included angle as a corner of said guideway, said bolt housing comprising a member of angular cross-sectional shape having leg walls connected respectively with said front wall portion and said rear wall portion and forming two guideway walls located opposite said included angle.

10. A latch device according to claim 9 and having a second bolt actuating means pivoted on one of said two guideway walls and including rollback means in said guideway and engageable with said bolt.

11. A latch device for mounting in an opening of a heat-insulated door, comprising a body having a front wall for substantially flush engagement with the portion of the door surrounding said opening and a pan-shaped portion on the rear side of said front wall and receivable in said opening, said pan-shaped portion providing a shallow-depth recess and having a rear wall portion at the bottom of the recess and spaced side walls on laterally opposite sides of said recess, bolt housing means located on the rear side of said front wall and providing a guideway extending along one of said side walls on the side of the latter opposite from said recess, a bolt in said guideway and movable between door-latched and door-unlatched positions, said bolt housing means being also receivable in said opening and the dimension of said bolt housing means in the front-to-rear direction of the latch device being not materially greater than the front-to-rear dimension of said body, spring means urging said bolt toward said door-latched position, a handle in said recess, a shaft connecting said handle with said body for swinging relative thereto, said shaft being pivotally mounted on said side walls and having a portion extending into said bolt housing means in a direction transverse to said guideway, and lever means on said shaft portion and effective against said bolt for moving the same toward said door-unlatched position in opposition to said spring means and in response to swinging of said handle.

12. A latch device comprising a front mounting wall, a pan-shaped hollow body connecting to and projecting rearwardly of the rear side of said front wall and having a shallow-depth recess and a rear wall at the bottom of said recess, bolt housing means on the rear side of said front wall and in a laterally adjacent relation to said pan-shaped portion, said housing providing a guideway, a bolt movable in said guideway between latching and unlatching positions, spring means urging said bolt toward said latching position, a handle having a normally retracted position in said recess and being swingable relative to said body, actuating means effective between said handle and bolt for moving the latter toward said unlatching position in opposition to said spring means and in response to swinging of said handle, a first flange on said rear wall and projecting toward said handle and said first flange having a first slot, said handle having a second flange projecting from the underside thereof toward said rear wall, said second flange having a second slot substantially aligned with said first slot when said handle is in said retracted position, and key-actuatable locking means pivoted on said handle including a locking member movable into the aligned slots of said flanges.

13. A latch device according to claim 12 wherein said key-actuatable means is located on said handle between said second flange and the pivot axis on which the handle is swingable.

14. A latch device according to claim 13 wherein said second flange lies on the side of said first flange remote from said pivot axis when said slots are in the aligned relation.

References Cited by the Examiner

UNITED STATES PATENTS

| | | | |
|---|---|---|---|
| 1,558,980 | 10/25 | Halinka. | |
| 2,401,854 | 6/46 | Berry | 292—341.19 |
| 2,941,834 | 6/60 | Appleton et al. | 292—341.19 |
| 3,055,204 | 9/62 | Pelcin | 70—153 |
| 3,081,617 | 3/63 | McKay | 70—153 |

M. HENSON WOOD, JR., *Primary Examiner.*